United States Patent [19]
Gillbrand et al.

[11] Patent Number: 5,572,975
[45] Date of Patent: Nov. 12, 1996

[54] DEVICE AND METHOD OF REGULATING THE START OF FUEL INJECTION IN AN OTTO ENGINE

[75] Inventors: Peter Gillbrand, Stockholm; Lars Tegnelius, Strängnäs, both of Sweden

[73] Assignee: Saab Automobile Aktiebolag, Sweden

[21] Appl. No.: 362,558

[22] PCT Filed: Jun. 30, 1993

[86] PCT No.: PCT/SE93/00593

§ 371 Date: Jan. 4, 1995

§ 102(e) Date: Jan. 4, 1995

[87] PCT Pub. No.: WO94/01669

PCT Pub. Date: Jan. 20, 1994

[30] Foreign Application Priority Data

Jul. 7, 1992 [SE] Sweden .................. 9202097

[51] Int. Cl.⁶ .................................................. F02D 41/34
[52] U.S. Cl. .......................................... 123/478; 123/492
[58] Field of Search .................................. 123/478, 480, 123/490, 491, 492, 493

[56] References Cited

U.S. PATENT DOCUMENTS

| | | | |
|---|---|---|---|
| 4,378,001 | 3/1983 | Takeda et al. | 123/445 |
| 4,646,698 | 3/1987 | Inoue et al. | 123/478 |
| 4,785,784 | 11/1988 | Nanyoshi et al. | 123/478 |
| 4,911,131 | 3/1990 | Nakaniwa et al. | 123/478 X |
| 4,961,411 | 10/1990 | Oshiage et al. | 123/492 |
| 4,967,706 | 11/1990 | Van Wechem et al. | 123/549 |
| 5,048,500 | 9/1991 | Curhan | 123/549 |
| 5,056,495 | 10/1991 | Yamashita et al. | 123/549 |
| 5,113,833 | 5/1992 | Nagano et al. | 123/478 X |
| 5,159,914 | 11/1992 | Follmer et al. | 123/478 X |
| 5,190,012 | 3/1993 | Takahashi | 123/479 |

FOREIGN PATENT DOCUMENTS

| | | |
|---|---|---|
| 0160949 | 11/1985 | European Pat. Off. |
| 3426469 | 1/1986 | Germany |
| 4020266 | 9/1991 | Germany |
| 4020267 | 10/1991 | Germany |

*Primary Examiner*—Tony M. Argenbright
*Attorney, Agent, or Firm*—Ostrolenk, Faber, Gerb & Soffen, LLP

[57] ABSTRACT

The invention relates to a device and a method which can be applied primarily to computer controlled fuel systems for Otto engines, with sequential injection of fuel in each cylinder to the inlet valves. In order to utilize the capacity of the hot inlet valves for evaporating the fuel, in normal operating cases, the invention is characterized in that the start of injection is continuously adapted to the prevailing fuel demand and the injection time consequently required, so that the injection is substantially completed before the inlet valve towards which the injector is directed will begin to open.

9 Claims, 2 Drawing Sheets

DEVICE AND METHOD OF REGULATING THE START OF FUEL INJECTION IN AN OTTO ENGINE

BACKGROUND OF THE INVENTION

This invention relates to a device and method for regulating the start of fuel injection in an internal combustion engine.

Because of the growing demand for minimizing emissions from Otto engines an increasing amount of interest has been shown in sequential computer controlled injection of fuel to the inlet valves. Sequential injection, where the fuel is injected individually for each cylinder to the inlet valve, where the cylinder is already in or at the beginning of the intake stroke, provides more precise dosing of the fuel before each combustion. There are a number of patents on computer controlled sequential injection. In U.S. Pat. No. 4,785,784 and U.S. Pat. No. 4,961,411 two computer controlled injection systems are described in which two injections per cylinder take place for each intake stroke, and in which the second injection provides a correcting quantity if the fuel requirement has been changed since the first injection was initiated. The purpose of this is to ensure a faster response in transient load cases. The two-stage injection in these patents generally takes place as a split injection, and also mainly whilst the inlet valve is open. Other solutions for reducing emissions include atomization of the fuel by evaporation on heating elements inserted in the intake duct immediately upstream from the inlet valve. Patents U.S. patent Application No. 4,967,706(=EP,A,343652) and DE,C,3426469 describe loose inserts which are heated with PTC elements. The disadvantage of these is that after the engine has warmed up the elements are cooled by the air flow, which renders evaporation difficult unless the heating plate is continuously heated electrically, and that the current consumption is very high, particularly in the case of a cold start. Other solutions are described in patents DE,A,4020266 and DE,A,4020267, where nearing elements are drilled into the cylinder head near the walls of the intake ducts, the disadvantage here being that the entire cylinder near constitutes a cooling body during the warming up phase, thereby necessitating a high current consumption for the intended heating of the walls. U.S. patent Application No. 4,378,001 describes a variant with the heating plate recessed in the intake manifold. U.S. patent Application No. 5,056,495 describes a heating plate permanently arranged in the intake manifold, on to which the fuel is injected directly for further distribution to the intake duct. The above-mentioned solutions involve directed injection to a heating plate which requires heating and hence continuous current consumption. U.S. patent Application No. 5,048,500 describes a heating plate which can be swivelled into the air flow and is arranged upstream of the inlet valve, but where the fuel nozzle is directed toward the heating plate arranged in the intake duct upstream from the inlet valve.

SUMMARY OF THE INVENTION

The invention is applied advantageously to Otto engines with electronic, computerized control of preferably sequential fuel injection. The object of this invention is to ensure that most of the fuel is injected to the inlet valve of the internal combustion engine, so-called indirect injection, immediately before the inlet valve begins to open, enabling a high proportion of the evaporation heat prevailing along the walls of the intake duct to be used for evaporating the fuel. The fuel is preferably injected to the valve rod close to valve head, or directly on to the valve head on the respective inlet valves, as a result of which the hottest sections, close to the combustion space, receive a shower of fuel which improves the evaporation and atomization of the fuel before the opening of the inlet valve. Very good evaporation of the fuel is achieved quickly with atomizing injectors to provide a homogeneous fuel-air mixture essential for complete combustion and the lowest possible emissions. In engines with two or more inlet valves per cylinder injectors are used for each cylinder, with a number of injection pens corresponding to the number of inlet valves, which pens are directed towards their own individual inlet valve.

In this respect, the device according to the invention means for determining the stroke position of the engine, fuel injection means selectively activatable during respective cycles of the engine for injecting fuel towards the inlet valve, and control means for controlling the activation and deactivation of the fuel injection means in accordance with a fuel amount demand. The control means includes a memory for storing the fuel amount demand during one cycle of operation as a base value. The control means activates the fuel injection means at a subsequent cycle of operation of the engine at a predetermined stroke position of the engine as determined by the stored base value and deactivates the injection means when the inlet valve begins to open.

The method according to the invention comprises determining a predetermined injection time prior to activation of the injection means, and activating the injection means for a time period equal to the predetermined injection time and in advance of the opening of the inlet valve such that the predetermined injection time is substantially completed when the inlet valve opens.

By using a predetermined injection time when opening the injector, based on a previous injection fuel amount, the calculating capacity of the computer is prevented from being tied up in continuous checking and calculating to determine whether the fuel demand has changed. When driving on highways at a constant road load and speed, the fuel demand rarely vanes to any substantial degree between two consecutive injections, thus the previous fuel amount is used largely uncorrected. In this respect, in the device of the invention the base value stored in the memory is continuously updated with a value corresponding to the fuel amount demand of the last completed injection of fuel by the fuel injection means. In accordance with the method of the invention, the predetermined injection time is continuously updated with the last completed injection time.

A further object is to reduce the calculation work required to calculate the fuel flow rate for each injection, yet ensure that most of the fuel supplied is injected to a closed valve, thereby releasing the calculating capacity of the injection system for other purposes and enabling cheaper microcomputers with slower calculating capacity to be used for the injection systems. The invention also provides improved facilities for integrating computer controllable engine functions other than the fuel system since the fuel amount calculation for each injection need only be calculated a limited number of times, preferably no more than twice, whilst still being aisle to obtain a fuel amount which is demanded by the instantaneous engine parameters. Other computer controlled functions may then be monitored, such as ignition system, charging pressure regulating system, and possibly also computer controlled gear changing, without impairing the fuel flow rate calculation.

A further object is that of being able to correct, tire fuel amount if a transient load case occurs between the previous injection and the current injection, based on previous injection.

The following description of an embodiment indicates other objects and advantages of the regulation of a variable injection start according to the invention, with a fixed position for the end of the injection immediately before the inlet valve opens. The description is given with reference to the attached drawings.

DESCRIPTION OF THE PREFERRED EMBODIMENT(S)

Figure 1:
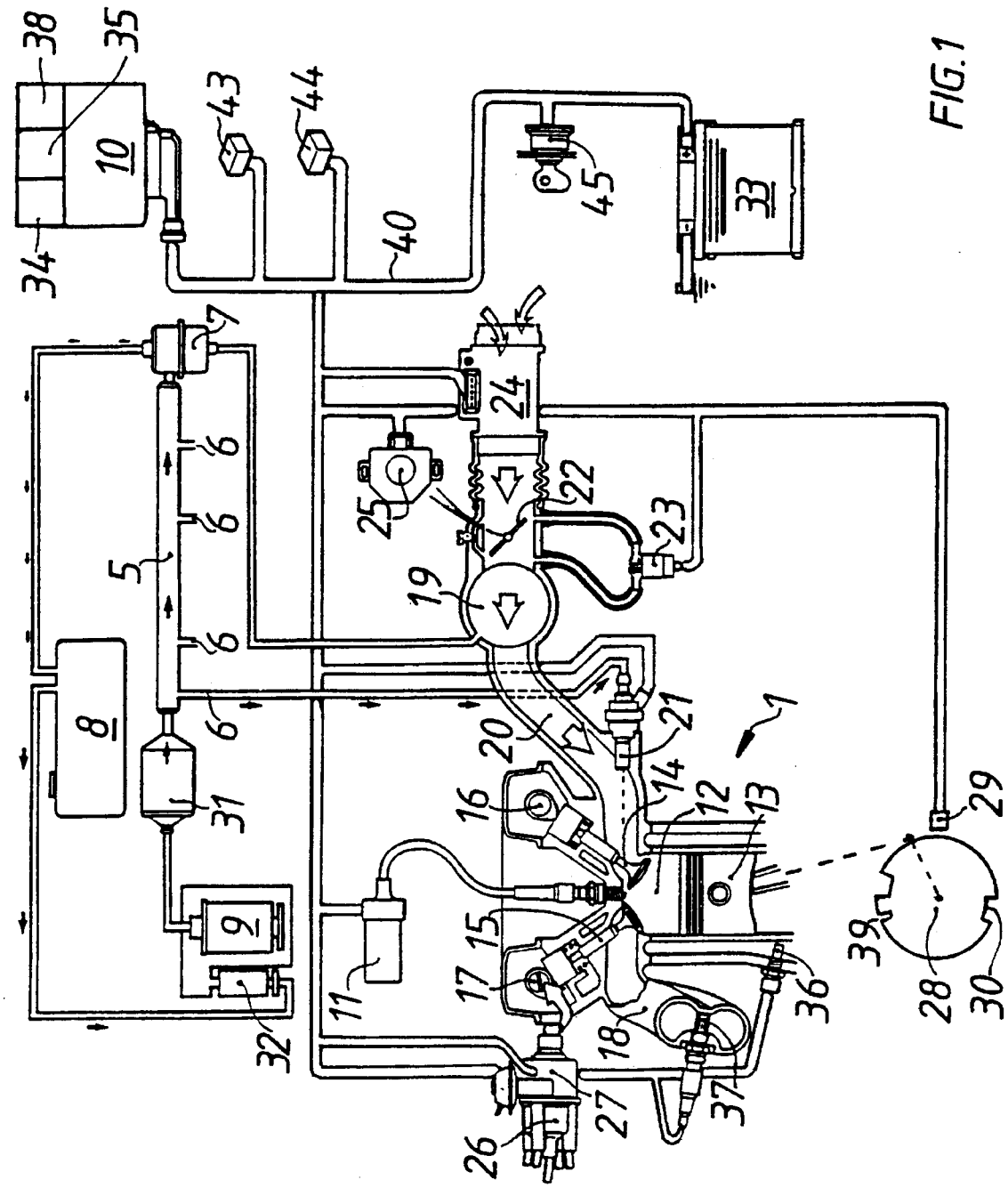
FIG. 1 shows an internal combustion engine with an injection system according to the invention.

FIG. 1 shows an injection system for an internal combustion engine 1 of the Otto type. The combustion engine comprises at least one cylinder 12 with a piston 13 arranged in it, which piston drives a crankshaft. The combustion space of the cylinder is fed with a fuel-air mixture in the intake stroke via inlet valve 14, which is opened with a camshaft 16. In the exhaust stroke exhaust valve 15 is opened with camshaft 17. The injection system is supplied with fuel via a preferably electrically driven fuel pump 9, which in practice is arranged in fuel tank 8, and which sucks fuel from the tank via a feed pump 32, and feeds it on to a fuel distribution pipe 5 via a filter 31. A number of fuel pipes 6 branches off from the fuel distribution pipe for each of the injectors 21 arranged in the inlet duct 20 of the respective cylinders. The pressure level in the fuel distribution pipe is determined by a pressure regulator 7, which keeps the fuel pressure constant in relation to the pressure in the engine intake manifold. This ensures that the injected quantity of fuel is not affected by the variable pressure in the intake manifold but only by the time during which the injector is open. Injector 21 consists of a conventional injection valve, preferably an electrically controlled magnetic valve of the solenoid type, mounted in the inlet ducts of the respective cylinders close to and directed towards the respective inlet valves 14.

The injector is directed so that the fuel jet hits the valve rod close to the valve head, or is directed directly on to the valve head on inlet valve 14. Because the fuel hits the valve and is dispersed over the valve head, the surface heated by the combustion in the cylinder is used for evaporating the fuel. The valve head is also heated very quickly when cold starting, essentially just as quickly as the electrically heated heating plates of the PTC type, produced for improved atomization/evaporation of the fuel for cold start. If engine 1 is fitted with two inlet valves 14 per cylinder, an injector with two injection ports is used, these ports being directed towards their own individual inlet valves to ensure that the largest possible heated area is obtained for the quantity of injected fuel required.

The injector opening time is controlled by a control unit 10 on the basis of a number of engine parameters detected by the control unit, representing toad, speed, engine temperature, mass of air sucked in and oxygen content of the exhaust gases. Control unit 10 is connected by a network of cables 40 to several transmitters for detecting the engine parameters, and to actuators which can be actuated for operation of the engine, and receives its power supply from a battery 33 via an ignition lock 45. The cable network also includes relays 43, 44 for the control device and fuel pump. Control unit 10 consists of a microcomputer based unit incorporating means for storing data in memory 34, arithmetical calculation of speed and the required quantity of fuel 35, as well as an interrupt register 38. The control unit receives information via the cable network 40 on the mass of air sucked in via an air mass meter 24 arranged upstream of the inlet pipe common to the cylinders, and via throttle 22 arranged before it. Air mass meter 24 may be of the conventional heated-wire type, where the resistance in the air rewound heated wire gives a direct measure of the mass of air sucked in.

Alternatively a pressure transducer can be arranged in the inlet pipe downstream from throttle 22, together with an air temperature gauge arranged upstream from throttle 22. The pressure and air temperature detected thereby can be used instead of air mass meter 24 for calculating the mass of air sucked in.

An analogue throttle position indicator 25, mounted on the throttle shaft, transmits information to control unit 10 on the position of throttle plate 22. Temperature gauge 36 transmits a continuous signal of the engine temperature directly to control unit 10. A lambda probe 37, which detects the oxygen content of the exhaust gases, is arranged in the exhaust manifold 18 of the engine, enabling control unit 10 to correct the fuel-air mixture given by the mass of air sucked in and the load, so that the optimum mixing ratio for the catalytic converter can be maintained. Control unit 10 also receives information on the engine crankshaft position. A transmitter 29 arranged on the flywheel detects reference markings 30 on a code disc 28 co-rotating with the flywheel. For a conventional four-cylinder four stroke engine with two pairs of pistons running with a phase displacement of the 180 crankshaft degrees, at least two reference markings 30 are required, offset 180 degrees to the code disc, for detecting the top dead center (TDC) of the respective pairs of pistons, together with an extra marking 39 for distinguishing which pair of pistons is at the top dead center. The extra marking 39 is located immediately before either of markings 30, and has a much smaller gap which results in a shorter distinguishable signal from transmitter 29, as opposed to the signal generated by markings 30.

In order to distinguish which of the cylinders for the pair of pistons considered is in the compression stroke/exhaust stroke, a camshaft transmitter 27 is also used. This transmitter is suitably arranged in an ignition distributor 26, which is driven by a camshaft 17. Alternatively an ion current sensor in the cylinder, preferably a sensor where the spark plug gap is used as the sensor device, can detect the cylinders in which combustion is taking place. These methods can be used to determine the ignition sequence, which is then used for sequential activation of the spark plug and injectors so that ignition and injection take place sequentially in the correct stroke position on the engine for the respective cylinders.

To achieve optimum performances and minimum emissions the fuel control system must be capable of detecting and handling engine parameter data which are as up to date and accurately measured as possible. Because of the stringent requirements regarding emissions, among other things, for which the system has been designed, it is not only the signal quality which is important. The actual measuring and regulating strategy will also determine the final result. The length of the injection time, and hence the fuel amount, are primarily a function of instantaneous engine parameters such as inlet pipe pressure, air temperature, throttle position and throttle movement, and several other correcting engine parameters such as engine temperature, starting conditions and oxygen content of the exhaust gases. The engine parameters are measured at different times and at different intervals. Temperatures are measured with slow updating and effective mean value formation. Engine parameter data such as inlet pipe pressure and throttle position are frequently updated, several times per engine revolution, on the basis of special strategies, to ensure a rapid response to throttle-up or throttle-down movements initiated by the driver.

As soon as the starting process has ended and the engine operation has been established, all the essential engine parameters have been detected and a fuel flow calculation based on this has been carried out. During the actual starting process the fuel amount and injection time are regulated by specific regulating algorithms used before the ignition sequence of the fuel injection sequence has been found. These start algorithms choke or enrich the fuel to ensure that the engine actually starts running. The fuel amount required when the engine operation has been established, after the starting process, and calculated on the basis of detected instantaneous engine parameters, is stored in a memory 34 in control device 10. Memory 10 may possibly contain a number of memory addresses corresponding to the number of cylinders. The last completed injection time for the cylinder in question is continuously stored in these addresses for the respective cylinders, and before the next injection the injection time which was last applicable to the cylinder in question is collected from the respective memory addresses. This injection time forms a base value for the injection time, this base value being used as a preliminary predetermined injection time when activating the injector.

The start timing of injection also affects performances and emissions. Several solutions have been developed in terms of bow the start timing of injection should be synchronized in relation to the compression stroke of the engine. In some solutions the injection has been synchronized so that it takes place at least to a certain extent during a period of time in which the inlet valve has opened. In this way the fuel is thought to be entrained by the air flow past the injector and on into the cylinder. The disadvantage in this case is that if the injector has difficulty in atomizing the fuel, relatively large drops of fuel reach the cylinder, resulting in incomplete combustion of the fuel drop.

Figure 2:
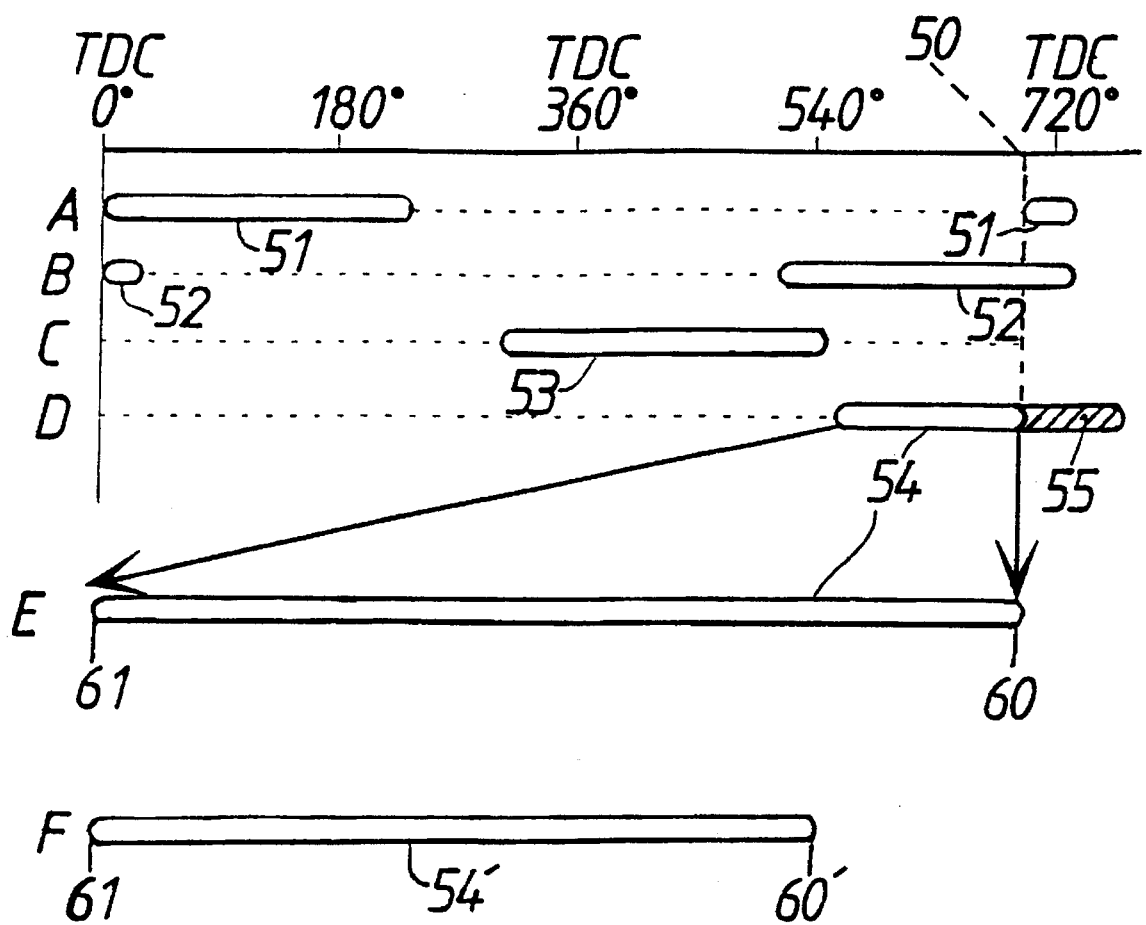
FIG. 2 shows a sequence diagram of events and measures taken during a four-stroke working cycle of one cylinder.

If use is instead made of a computer controlled fuel injection system which is so fast that there is time to vary the start of any injection, the start of injection can be initiated so that the injection is largely completed by the time inlet valve 14 is to open. This enables most of the fuel to be injected onto a not inlet valve 14 so that the heat can be absorbed, and for easier evaporation and atomization in the air sucked in by the motor during subsequent inlet valve opening. This provides a more homogeneous fuel-air mixture, which results in more complete combustion of the fuel supplied. At a given time during the crankshaft revolution it is calculated when the next fuel valve is to open, see FIG. 2. FIG. 2 shows a sequence diagram of different events A-B and measures C-D taken during a four-stroke cycle for a particular cylinder. A shows when inlet valve 14 is kept open over crankshaft range 51, and B shows when outlet valve 15 is kept open over crankshaft range 52. With a conventional camshaft drive which cannot be regulated there is a certain overlap when inlet valve 14 opens and exhaust valve 15 closes. C shows how a measurement of the instantaneous engine parameters prevailing during a corresponding period of time is carried out within crankshaft range 53. Either detected values give rise to an updating of mean value formed data, as previously indicated, or other values are updated directly for fast response without any weighting or mean value formation, which values are stored in memory 34 of control unit 10. D shows when the injection valve is kept open, its opening being controlled by reference position 50, determined by the start of the opening of the inlet valve. E and F show on an enlarged scale injection interval D, where 61 denotes the opening time and 60 the closing time. In F a variant is shown where the measurement within crankshaft range 53 has given rise to a reduction in the required fuel flow rate, enabling closing to take place in an earlier position 60'.

With a crankshaft transmitter 28–30, shown in FIG. 1, the markings are used both for calculating the speed, which indicates the time delay until the arrival of the next TDC marking 30, and for creating an interrupt in an interrupt function when a position before TDC is reached when an injection is to begin. With the speed indicated the time required until the fixed position 50 in the compression stroke is reached for the opening of inlet valve 14 can be determined by a simple arithmetic calculation, in normal. load cases it is desirable to ensure that most of the fuel is injected out to the closed valve, thus enabling the hot valve head to evaporate the fuel, injection to the open valve is only required in extreme load cases which may arise, for example, during vigorous accelerations, when it is necessary to feed as much fuel as possible into the cylinder, and in certain cold start cases. By subtracting the injection time last completed from the time calculated by the control unit to reach the inlet valve opening position, crankshaft position 50, an injection start time is obtained which is stored in interrupt register 38. The injection time last completed, and used for controlling the injection time, can either consist of the injection time last completed for the respective cylinder, or of the injection time last completed in the injection sequence.

When this crankshaft angle 50 is reached an interrupt is generated which opens the fuel valve automatically with a predetermined injection time lapsed on a previous calculation, appropriately the injection time which was applicable to the injection last completed. As in the case of the injection time control, the injection time last completed and used for calculating the fuel amount can either consist of the injection time last completed for the respective cylinder or the injection time last completed in the injection sequence. When the injector opens interrupt register 38 is loaded with a time value corresponding to the required predetermined injection time, and a first additional calculation of the required fuel demand is initiated with the engine parameters which immediately preceded the start timing of opening and which was detected during a portion 53 of the crankshaft revolution. If the first calculation carried out in parallel with the open injection valve indicates that the injection time needs to be modified, the time value stored in interrupt register 38 is corrected. If necessary a correction can only be carried out if the difference is substantial and exceeds a predetermined threshold value between the predetermined fuel amount and the fuel amount demanded by the instantaneous engine parameters detected during interval 53 of the crankshaft revolution. The system then resumes other tasks whilst the injection valve remains open.

When the required injection time stored in interrupt register 38 has expired at position 60, a new interrupt is generated. During this interrupt generation the injector is first commanded to close, whereupon the system immediately checks whether there has been a throttle movement since the last injection time calculation, carried out when the injector opened, which movement would indicate a commanded acceleration and fuel enrichment. If this is the case a second additional calculation of the instantaneously demanded fuel enrichment requirement begins.

The fuel enrichment requirement is calculated as a function of the most significant engine parameters for this, such as at least throttle position, throttle derivatives and engine temperature. The time taken for this fuel enrichment calculation lies in the 100 microsecond range, which means that a conventional electromechanical valve does not nave time to begin closing before the calculation is complete.

With a microcomputer with a clock frequency of 16 mHertz and a handling capacity of 2 million instructions per second, the 3000 or so instructions required for one complete fuel flow rate calculation, corresponding to the first additional calculation at the time of opening, am run through in just over 1 millisecond (1 ms). Such a complete fuel flow rate calculation calculates and corrects the fuel flow rate on the basis of all the detected engine parameters which may influence the required fuel flow rate. These may include load (i.e. air mass), speed, lambda value, engine temperature, after-start conditions (enrichment), temperature corrections and idling adjustment.

Normally the full fuel flow rate calculation can be comfortably completed after the injector has opened and before the injector closes. In specific load cases, such as decelerations (engine braking), where the injection time is negligible bed use there is no actual fuel demand, there will be time for the injector to be commanded to close, if it in fact, opens, before the full calculation has been completed. However, the base injection value stored in the memory is updated for use as the predetermined injection time before the next injection, when one complete calculation of the fuel amount is carried out in parallel with the opening of the valve. However, the second additional fuel flow rate calculation, which is initiated immediately after the commanded closing of the injector, only uses the parameters most indicative of increased load for calculating the fuel enrichment. These parameters consist primarily of throttle position and throttle derivatives, and secondarily of the engine temperature, and the load enrichment requirement is calculated with these parameters on the basis of hundreds of instructions in the computer of control unit 10, which instructions are run through in something like 100 microseconds.

When a required additional injection time is calculated with a second additional fuel amount calculation, corresponding to the fuel enrichment requirement, interrupt register 38 is loaded with the extra injection time 55 calculated thereby, whereupon a counter-command for opening injection valve 21 is issued by control unit 10. Mechanically the valve has no time to react to this sequence of commands and counter-commands, but the injection is experienced as a single, somewhat extended injection time. When the additional injection time 55 which may have been ordered has also expired, a new interrupt is generated which automatically closes valve 21. After each completed injection, whether it bas been given an extra injection time 55 or bas been shortened by premature closing at 60', depending on a detected deceleration during interval 53 of the crankshaft revolution, the last completed injection time is stored continuously as a new base value in memory 34 of the control unit, for use as the predetermined injection time for subsequent injection.

In certain load cases, high load and high speed, the fuel injectors may need to be activated/open for so long that they partially overlap. In other words an injector may still the in the final phase of its opening time when the injector of the next cylinder is activated for opening. In these cases the injection time of the immediately preceding cylinder cannot be used when the injector of the next cylinder is opened because the latter injector opens before the preceding injector has completed its injection. In these cases the injection time with which the last but one cylinder was completed is used as the base value and predetermined injection time. Alternatively there may have been time for this base value to have been corrected for the engine parameters which preceded the moment of opening, widen injection and not yet been completed, this injection taking place in parallel and overlapping with the injector to be opened.

The invention described will not be limited to engines with valve opening times which cannot be regulated. The invention can also be applied in the case of phase displaceable camshafts, but here a please displacement of the inlet valve gives nee to a corresponding influence on the opening of the injection valve. The strategy described, with only two required fuel flow rate calculations at most for each injection time at the most critical stages of the injection, namely at the time of opening and closing, provides a minimum of required calculations yet a fast response is possible in transient load cases. The first additional event controlled fuel calculation at the start of the injection quickly captures not only commanded decelerations, but accelerations which take place on this occasion, which the second additional event controlled fuel calculation at the end of the injection captures the fuel enrichment requirement for accelerations at as late a stage as possible, whilst retaining a single injection interval. This releases capacity in the microcomputer of the control unit for other purposes, thus creating better conditions for so-called engine-management systems, where several engine systems, such as the ignition system, turbo system, antispin system etc. can be integrated and handled by a single computer. With microprocessors with a faster calculating capacity than 2 million instructions per second, injectors with much faster response than conventional magnetic valves of the solenoid type can be used. Such injectors may, for example, be of the piezo type, where piezo elements stacked one on top of the other form the valve cone and quickly change shape when voltage is supplied, with a much faster response than the magnetic valves now used conventionally. With faster processors such piezo injectors can also be commanded to close, whereupon a further event controlled fuel demand calculation gives rise to a counter-command for opening before the valve mechanically has had time to begin to close.

Although the present invention has been described in relation to a particular embodiment(s) thereof, many other variations and modifications and other uses will become apparent to those skilled in the art. It is preferred, therefore, that the present invention be limited not by the specific disclosure herein, but only by the appended claims.

We claim:

1. A device for regulating the start of fuel injection in an internal combustion engine having at least one cylinder with at least one inlet valve selectively openable and closeable during repetitive cycles of the engine to control the introduction of fuel into the cylinder, which device comprises:

means for determining the stroke position of the engine;

fuel injection means selectively activatable during respective cycles of the engine for injecting fuel towards the inlet valve; and control means for controlling the activation and deactivation of the fuel injection means in accordance with a fuel amount demand, the control means including a memory for storing the fuel amount demand during one cycle of operation as a base value, the control means activating the fuel injection means at a subsequent cycle of operation of the engine at a predetermined stroke position of the engine as determined by the stored base value and deactivating the injection means when the inlet valve begins to open.

2. A device according to claim 1, wherein means are provided for adjusting the activation time of the injection means.

3. A device according to claim 2, wherein the adjusting means adjusts the activation time of the injection means based on at least one instantaneous variation in the fuel amount demand between the time of activation of the injection means and the time of deactivation of the injection means.

4. A device according to claim 2, wherein the base value stored in the memory is continuously updated with a value corresponding to the fuel amount demand of the last completed injection of fuel by the fuel injection means.

5. A device according to claim 1, wherein the inlet valve opens at a predetermined stroke position of the engine, means are provided for detecting the speed of the engine and the control means activates the injector means in advance of opening of the inlet valve in accordance with the speed of the engine so that the injection means activation time corresponds to the time for rotation of the engine between the activation of injection and the opening of the inlet valve.

6. A method of regulating the start of fuel injection in an internal combustion engine having at least one cylinder with at least one inlet valve selectively openable and closeable during repetitive cycles of operation of the engine to control the introduction of fuel into the cylinder and fuel injection means selectively activatable and deactivatable during repetitive cycles of the engine for injecting fuel toward the inlet valve, which method comprises the steps of:

determining a predetermined injection time prior to activation of the injection means; and activating the injection means for a time period equal to the predetermined injection time and in advance of the opening of the inlet valve such that the predetermined injection time is substantially completed when the inlet valve opens, the injection time of a preceding completed injection being used as the predetermined injection time.

7. A method according to claim 6, wherein the predetermined injection time is continuously updated with the last completed injection time.

8. A method according to claim 6, wherein the engine has a plurality of the cylinders and corresponding injection means, and a predetermined injection time is determined for each of the cylinders.

9. A method according to claim 8, in which the predetermined injection time for each cylinder is updated with the last completed injection time for such cylinder.

* * * * *